United States Patent [19]

Ross

[11] Patent Number: 4,480,333

[45] Date of Patent: Oct. 30, 1984

[54] METHOD AND APPARATUS FOR ACTIVE SOUND CONTROL

[75] Inventor: Colin F. Ross, Cambridge, England

[73] Assignee: National Research Development Corporation, London, England

[21] Appl. No.: 368,095

[22] Filed: Apr. 13, 1982

[30] Foreign Application Priority Data

Apr. 15, 1981 [GB] United Kingdom ................. 8111906

[51] Int. Cl.[3] ............................................. H04B 15/00

[52] U.S. Cl. .......................................... 381/71; 381/94

[58] Field of Search ....................... 179/81 B; 181/206; 381/71, 94

[56] References Cited

U.S. PATENT DOCUMENTS

| | | | |
|---|---|---|---|
| 3,936,606 | 2/1976 | Wanke | 179/1 P |
| 4,025,724 | 5/1977 | Davidson, Jr. et al. | 179/1 P |
| 4,122,303 | 10/1978 | Chaplin et al. | 179/1 P |
| 4,153,815 | 5/1979 | Chaplin et al. | 171/1 P |

FOREIGN PATENT DOCUMENTS 2054999 2/1981 United Kingdom .

*Primary Examiner*—Gene Z. Rubinson
*Assistant Examiner*—James L. Dwyer
*Attorney, Agent, or Firm*—Cushman, Darby & Cushman

[57] ABSTRACT

Sound control systems which employ sound cancellation may deteriorate due to ageing or change of conditions. The system described is contructed to change according to the sound level at a point where cancellation is to be achieved by sound from a loudspeaker driven by modified signals from a microphone which picks up sounds from a noise source. The signals from the microphone pass through a filter circuit having a transfer function which is controlled by a controller. Signals from the point where cancellation is required, and after modification, from the microphone and the filter circuit are employed by the controller to derive a control signal for the filter circuit.

10 Claims, 6 Drawing Figures

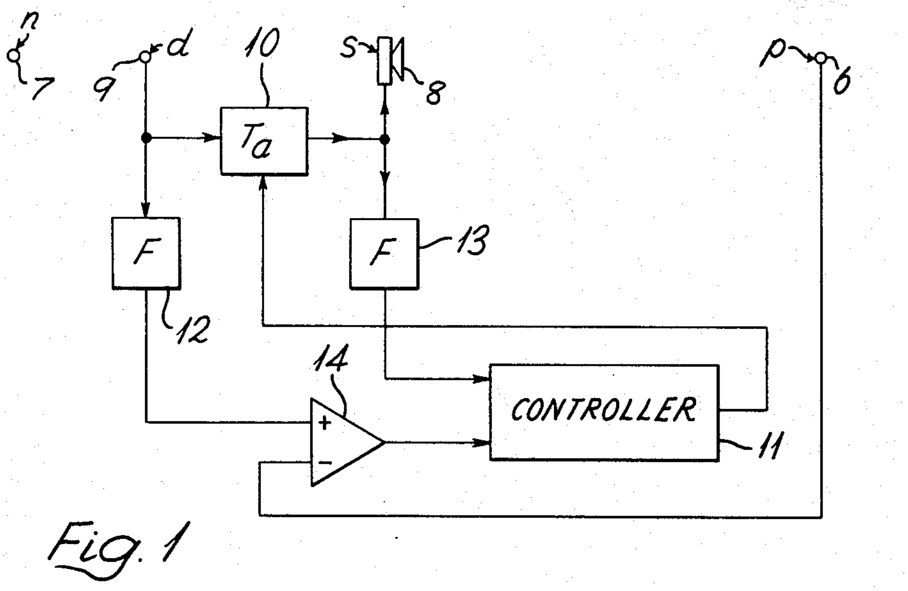
Fig. 1
Fig. 3
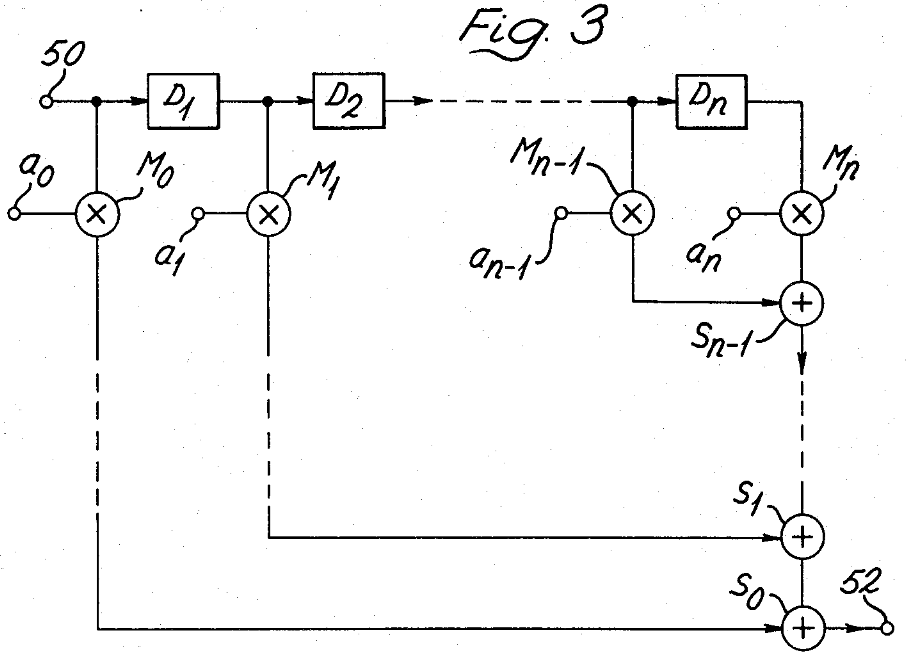

METHOD AND APPARATUS FOR ACTIVE SOUND CONTROL

FIELD OF THE INVENTION

The present invention relates to methods and apparatus for reducing noise in a certain region by providing a sound source which generates pressure variations tending to cancel pressure variations in the region due to noise and therefore to quieten the region. It is particularly, but not exclusively, applicable to the reduction of noise in ducts.

BACKGROUND OF THE INVENTION

In one type of known control system, a noise source transmits noise along a duct and the duct contains a sound control system comprising a microphone downstream from the noise source connected by way of a filter and a power amplifier to a loudspeaker which is itself downstream from the microphone. The loudspeaker generates sounds dependent on noise from the source with the aim of cancelling noise further down the duct and in particular at a certain point.

A major problem with a noise control system of this type is that it may become less effective as time goes on since, for example, analogue components drift and other conditions change as the layout of the system is altered. It is very inconvenient to continually stop the sound control system, re-measure the various characteristics involved in its construction and modify the system accordingly.

SUMMARY OF THE INVENTION

According to a first aspect of the present invention there is provided a sound control system comprising first receiver means for generating first output signals representative of sound received at, or near, a first location where sound from a second location is to be cancelled and second receiver means for generating second output signals representative of sound at a third location generally in the path of sound to be cancelled, operational means for operating on the second output signals according to a transfer function to provide input signals for transmission means for generating sounds at a fourth location for noise cancellation, and control means for automatically controlling the said transfer function at least partly in accordance with the output signals of the first and second receiver means.

With such an arrangement the automatic control of the transfer function of the operational means may be arranged to ensure that as time passes sound cancellation is maintained or improved. By using the signals driving the transmission means (by way of the operational means) as well as signals from the point where cancellation is to take place to control the transfer function, allowance can be made for the effect of the sound from the transmission means on the signal driving the transmission means.

The first and second receiver means may comprise first and second sound receivers, such as microphones plus signal processing circuits. Alternatively if the noise source at the second location is a machine operating a repetitive cycle, the first receiver means may include means for detecting position in the machine cycle, instead of a microphone. Other sound detecting means, such as means for detecting light output from a flame (positioned where sound is to be detected) may be used as alternatives to microphones.

The transmission means may also be positioned in the path of sound to be cancelled, and the operational means may comprise a digital filter either in hardware or software form, connecting the second receiver to the transmission means.

Preferably the distance between the first location and the fourth location plus the distance between the second location and the third location is less than the distance between the first and second locations. The foregoing condition makes it possible for sound from the transmission means to reach the first location at the same time as sound from the second location which, by and large, gave rise to the sound generated by the transmission means. In some circumstances an adequate system may be provided when the above condition relating to the distance between the four locations is not met. For example the cyclic nature of most sounds over at least a short period may sometimes be used to give cancellation when the sound generated by the transmission means cancels sound from the noise source by deriving sounds from earlier cycles from the noise source.

The control means of the first aspect of the invention may comprise first filter means for deriving a first control signal equal to the second output signals multiplied by a further transfer function, and second filter means for deriving a second control signal equal to the input signals for the transmission means multiplied by the said further transfer function, a third control signal being formed by the said first output signals. The control means may then comprise system-identification means connected to receive the third control signal subtracted from the first control signal, and the second control signal, and the system-identification means providing an output signal for setting the transfer function of the operational means.

The said further transfer function may be such that when sound cancellation at the first location is the best that can be achieved, the system-identification means sets the transfer function of the operational means to the value currently in use, but when there is no significant sound cancellation at the first location, the system-identification means sets the transfer function of the operational means to a value which causes convergence towards best achievable sound cancellation.

The said further transfer function may be equal to the transfer function between the second location and the output of the first receiver means divided by the transfer function between the second location and the output of the second receiver means.

The system-identification means may be constructed to divide the second control signal by the difference between the first and third control signals to provide a value for the transfer characteristic of the operational means.

Preferably the operational means and the said first and second filter means comprise digital filters which may either be in hardware form or in the form of programs carried out by one or more computers. Where the operational means is formed by a digital filter, the system-identification means provides output signals in the form of coefficients for the digital filter.

According to a second aspect of the present invention there is provided a method of sound control for reducing noise in a first location due to a noise source in a second location, the method comprising generating first and second output signals representative of sounds received at the first location and at a third location, respectively, operating on the said second output signals according to a transfer function to provide signals for generating sounds at a fourth location, the transfer function being such that sounds generated at the fourth location tend to cancel sound from the second location at the first location, and automatically controlling the said transfer function at least partly in accordance with the said first and second output signals.

In controlling the transfer function, the second output signals and the said signals for generating sounds may be multiplied by a further function to provide first and second control signals, respectively, the first output signal may be subtracted from the first control signal, and the second control signal may be divided by the resultant of the said subtraction to provide a value for the said transfer function. The further function may be the transfer function between the second location and the first output signals divided by the transfer function between the second location and the second output signals.

An equation giving the required transfer function of the first and second aspects of the invention will now be derived.

If $T_a$ is any transfer function between the second receiver and input to the transmission means then $$S=T_aD \quad \text{Equation 1}$$

where S is the input signal to the transmission means and D is the output from the second receiver means.

When noise N from the second location is present, the output from the second receiver means is $$D=A_{ds}S+A_{dn}N \quad \text{Equation 2}$$

(where $A_{ds}$ is the transfer function from the input of the transmission means to the output of the second receiver means and $A_{dn}$ is the transfer function from the second location to the output of the second receiver means), and the first output signal P from the first receiver means at p is $$P=A_{ps}S+A_{pn}N \quad \text{Equation 3}$$

(where $A_{ps}$ is the transfer function from the input of the transmission means to the output of the first receiver means and $A_{pn}$ is the transfer function from the second location to the output of the first receiver means).

From equations 1, 2 and 3

$$P = \frac{A_{ps}T_aA_{dn}N}{1 - T_aA_{ds}} + A_{pn}N. \quad \text{Equation 4}$$

Without noise cancellation $P=A_{pn}N$ and thus $$\text{Noise reduction} = \frac{P\text{ (with cancelling)}}{P\text{ (without cancelling)}} = 1 + \frac{T_aA_{ps}A_{dn}/A_{pn}}{1 - T_aA_{ds}} = \frac{1 - T_a(A_{ds}A_{pn} - A_{ps}A_{dn})/A_{pn}}{1 - T_aA_{ds}}$$

$$\text{and if } T_d = \frac{A_{pn}}{A_{ds}A_{pn} - A_{ps}A_{dn}} \quad \text{Equation 5}$$

-continued $$\text{Noise reduction} = \frac{1 - T_a/T_d}{1 - T_aA_{ds}}$$

That is if $T_a=T_d$, the point p will be in silence and hence the required value for $T_d$ is as given in equation 5.

BRIEF DESCRIPTION OF THE DRAWINGS

Certain embodiments of the invention will now be described, by way of example, with reference to the accompanying drawings, in which:

FIG. 1 is a block diagram including a sound control system according to the invention, FIG. 3 is a block diagram of networks which may be used in filters of FIGS. 1 and 2.

DETAILED DESCRIPTION OF THE INVENTION

Figure 2:
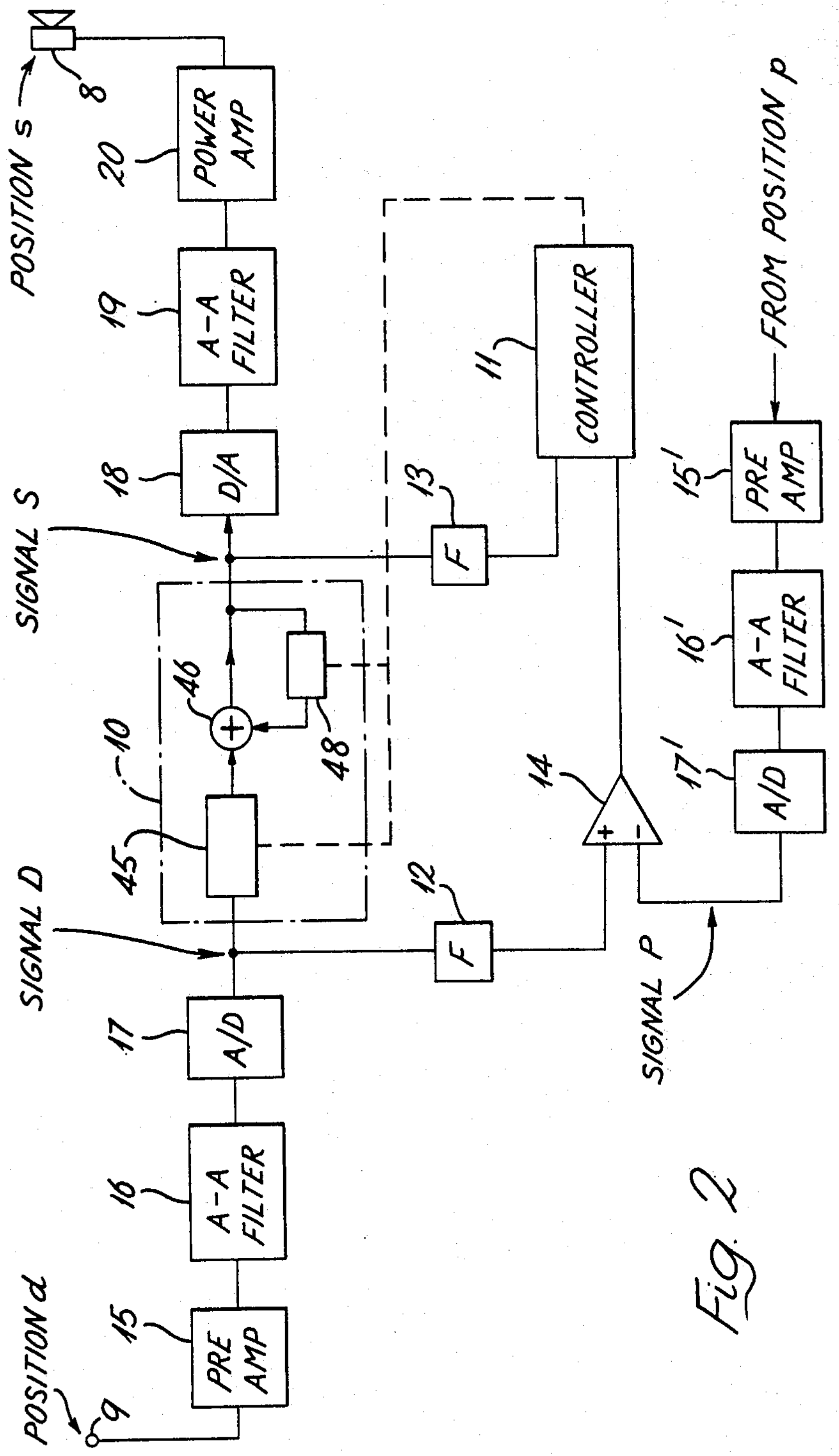
FIG. 2 is a more detailed version of the sound control system of FIG. 1.

The objective of the arrangement shown in FIG. 1 is to achieve as much cancellation in the immediate area of the microphone 6 at p as possible of sound from a noise source 7 at n. Sound for cancellation is obtained from a loudspeaker 8 at s driven from a microphone 9 at d by way of a circuit 10 having a variable transfer function $T_a$. A controller 11 controls the function $T_a$ and in order to do so receives two signals to identify the required function. The process of "system identification" carried out by the controller 11 will be described in more detail below. In order to develop the system identification signals for the controller 11 two filters 12 and 13 with identical transfer functions F each equal to $A_{pn}/A_{dn}$ are employed together with a subtraction circuit 14 such as a differential amplifier.

To simplify FIG. 1, circuits 15, 16 and 17 associated with the microphone 9, 15', 16' and 17' associated with the microphone 6, and 18, 19 and 20 associated with the loudspeaker 8 are omitted. These circuits are discussed below and shown in FIG. 2.

Since the filter 12 is connected between the output of the circuits associated with the microphone d and the one input of the subtraction circuit 14, the signal reaching this input is $$FD = \frac{A_{pn}N}{1 - A_{ds}T_a}. \quad \text{Equation 6}$$

From equations 1, 2 and 3 given above by eliminating S we obtain $$D = \frac{A_{dn}}{1 - A_{ds}T_a}N, \text{ and } P = \frac{A_{pn} - T_a[A_{ds}A_{pn} - A_{ps}A_{dn}]}{1 - A_{ds}T_a}. \quad \text{Equation 7}$$

Equation 7, since it is the signal obtained from the circuits associated with the microphone 6 at p, is a measure of the performance of the system and if this performance signal P is subtracted in the subtraction circuit 14 from the signal of equation 6 then $$FD - P = \frac{T_a[A_{ds}A_{pn} - A_{ps}A_{dn}]}{1 - A_{ds}T_a} N. \quad \text{Equation 8}$$

The output from the circuit 10 after passing through the filter 13 becomes $$FT_aD = \frac{T_aA_{pn}}{1 - A_{ds}T_a} N. \quad \text{Equation 9}$$

Thus the controller 11 receives signals corresponding to the equations 8 and 9 and is able to form the ratio:

$$\frac{FT_aD}{FD - P} = \frac{A_{pn}}{A_{ds}A_{pn} - A_{ps}A_{dn}}. \quad \text{Equation 10}$$

This is equation 5 given earlier which gives the required characteristic $T_d$ for the circuit 10; that is $T_a$ should equal $T_d$ for best sound cancellation at p.

In order to provide some qualitative understanding of the operation of the system shown in the drawing, consider the situation when $T_a$ is very small and so little sound is produced by the loudspeaker 8 at s. The subtraction circuit 14 then receives almost equal signals since F is the ratio of transfer characteristics between the noise N from the source 7 and the signals P and D from the circuits associated with the microphones 6 and 9. Thus the output from the subtraction circuit 14 is very small and the denominator of the ratio on the left hand side of equation 10 is a very small quantity which may result in a moderate value for the ratio, even though the numerator is also small, indicating that changes must be made in the characteristic $T_a$.

If, on the other hand, sound correction is perfect the signal from the microphone 6 at p is zero and therefore the output from the subtraction circuit 14 is DF. The signal received at the other terminal of the controller 11 is $DT_aF$ and since the controller 11 divides the latter signal by the former in carrying out system identification, it provides a characteristic $T_a$ for the circuit 10; that is the same characteristic is provided and optimum correction continues.

Initially the system is set up with a characteristic $T_a$ which is a good estimate and the system then operates between the two extremes just given. However, the question arises as to whether the system shown in FIG. 1 will converge and produce sound cancellation. If $\alpha$ represents the error in the characteristic F and $\beta_i$ the ratio between the $i^{th}$ attempt at correction and the desired correction, then it is found that convergence will occur if $$|\beta_i| > \frac{2|\alpha|}{1 - |\alpha|} \text{ for } |\alpha| > 1$$

This does not represent a very stringent constraint on the initial value of $|\beta|$. It is also necessary that the initial value for $T_a$ is stable when connected in the system being controlled, that is the system is closed loop stable. This can usually be achieved by reducing the gain of $T_a$.

The circuit 10 and the filters 12 and 13 are conveniently be formed by digital filters; for example either separate filters constructed from integrated circuits, or separate microprocessors, or a microcomputer or microprocessor forming all three digital filters, the differential amplifier 14 and the controller 11. In all cases it is preferable for the controller 11 to be a microcomputer or a microprocessor which calculates the coefficients required for the digital filters of the circuit 10.

Digital filters are described in the book "Digital Filters: Analysis and Design" by Andreas Antoniou, published by McGraw Hill, 1979.

The block diagram of FIG. 2 shows the circuits required for an exemplary embodiment using digital filters. The pre-amplifier 15 is connected to an anti-aliasing filter 16 which is connected to an analogue-to-digital converter 17. These three 15, 16 and 17 are considered part of the microphone receiver circuitry and thus the output signal D comes from the output terminal of 17. As is well known an anti-aliasing filter is provided to prevent the sampled outputs from an analogue-to-digital converter from suggesting that a low frequency or alias signal is present.

The circuit 10 may be a digital filter formed by an input network 45, an adder 46 and a feedback network 48. The operation of the digital filter 10 is described in more detail below. Filters 12 and 13 may be similar in form to the filter 10.

Signals from the circuit 10 are passed to a digital-to-analogue converter 18 and then to an anti-aliasing filter 19 which "smooths" the samples from the converter 18 so that high frequency signals present in the stepped output of the converter 18 are removed. It is necessary to remove these signals since the digital filters 10, 12 and 13 and the remainder of the system are not designed to cope with signals above half the sampling frequency of the analogue-to-digital converter 17. Such signals could cause unpleasant effects at p. Signals from the anti-aliasing filter 19 are amplified in a power amplifier 20 and applied to the loudspeaker at s. The digital-to-analogue converter 18, anti-aliasing filter 19 and the power amplifier are considered part of the loudspeaker circuitry and the input signal S is applied to the input terminal of 18.

Signals from the microphone at p are treated in the same way as those from the microphone at d in that they are passed through a pre-amplifier 15', an anti-aliasing filter 16' and an analogue-to-digital filter 17'. The output signal P is the output from the terminal of 17'.

The filter coefficients for the networks 45 and 48 of the circuit 10 are calculated by the controller 11 from the signals supplied to it and this process is known as "system identification" and a number of suitable methods is given in the paper by Åström, K. J. and Eykhoff, P. in "System Identification—A Survey", Automatica, Volume 7, pages 123 to 162, 1971.

Following from this paper the determination of the filter coefficients is now briefly described.

If $A_{pn}N = y(k)$ and $(A_{ps}A_{dn} - A_{ds}A_{pn})N = u(k)$, where $1 \leq k \leq M$ autocorrelation of u(k) and y(k) is given by $$R_u(i) = \frac{1}{M - i} \sum_{k=1}^{M-i} u(k)\,u(k + i) \text{ and}$$

$$R_y(i) = \frac{1}{M - i} \sum_{k=1}^{M-i} y(k)\,y(k + i), \text{ respectively; and}$$

correlation of u(k) and y(k) is given by $$R_{yu}(i) = \frac{1}{M - i} \sum_{k=1}^{M-i} y(k)\,u(k + i) \text{ and}$$

-continued $$R_{uy}(i) = \frac{1}{M-i} \sum_{k=1}^{M-i} y(k+i)\, u(k),$$

where i varies from 0 to n.

If these correlations are written as a symmetric matrix $$M = \left[\begin{array}{c|c} \begin{matrix} R_y(0), & R_y(1), \ldots & R_y(n-1) \\ & R_y(0), \ldots & R_y(n-2) \\ & & R_y(0) \end{matrix} & \begin{matrix} -R_{yu}(0), & -R_{uy}(1), \ldots & -R_{uy}(n-1) \\ -R_{yu}(1), & -R_{yu}(0), \ldots & -R_{uy}(n-2) \\ -R_{yu}(n-1), & -R_{yu}(n-2), \ldots & -R_{yu}(0) \end{matrix} \\ \hline & \begin{matrix} R_u(0), & R_u(1), \ldots & R_u(n-1) \\ & R_u(0), \ldots & R_u(n-2) \\ & & R_u(0) \end{matrix} \end{array}\right]$$

and also as a vector in the form of a column matrix $$C = \left[\begin{array}{c} -R_y(1) \\ -R_y(2) \\ \cdot\cdot \\ \cdot\cdot \\ -R_y(n) \\ \hline R_{uy}(1) \\ R_{uy}(2) \\ \cdot\cdot \\ \cdot\cdot \\ R_{uy}(n) \end{array}\right]$$

then by the "least squares" system identification method the coefficients required $\beta$ Where $\beta=[a_1, a_2, a_3, \ldots a_n, b_0, b_1, \ldots b_n]^T$ are given by $\beta=M^{-1}C$, where $M^{-1}$ is the inverse of the matrix M and $[..]^T$ is the transpose of [..].

These coefficients can be used to set a hardware digital filter or to program a computer to act as a digital filter. In either case the digital filter can be of the type shown in FIG. 2 at 10 and FIG. 3(these figures illustrating one of the digital filters mentioned in the above mentioned book entitled "Digital Filters: Analysis and Design").

Each of the networks 45 and 48 is as shown in FIG. 3 where an input terminal 50 is connected to n delay circuits $D_1$ to $D_n$ connected in series. The input terminal 50 is also connected to the first of a series of multipliers $M_0$ to $M_n$, the other multipliers in the series being connected to the outputs of the delay circuits $D_1$ to $D_n$, respectively. The output of the multiplier $M_n$ is connected by way of adder circuits $S_0$ to $S_{n-1}$ connected in series between the multiplier and an output terminal 52. The adder circuits $S_0$ to $S_{n-1}$ receive a further input from the multipliers $M_0$ to $M_{n-1}$, respectively. Each of the multipliers in FIG. 3 is shown with a further input designated $a_0$ to $a_n$, respectively which represent means for setting the factor or coefficient used in multiplication. Since the circuit shown in FIG. 3 is a digital circuit the coefficient $a_0$ to $a_n$ may be held in respective registers and, in effect, counted down to zero in each multiplication process. Typically n is equal to fifteen to twenty and each of the delays $D_1$ to $D_n$ is approximately 1,000th of a second. Table I below gives a typical set of coefficients $b_0$ to $b_{17}$ for the network 45 and a further typical set of coefficients $a_0$ to $a_{17}$ for the network 48.

TABLE I

| | | | |
|---|---|---|---|
| $a_0$ | = 1 | $b_0$ | = .3698036E + 01 |
| $a_1$ | = −.1350325E + 01 | $b_1$ | = −.6868942E + 01 |

TABLE I-continued

| | | | |
|---|---|---|---|
| $a_2$ | = .7919101E − 01 | $b_2$ | = .3075350E + 01 |
| $a_3$ | = .1815468E + 00 | $b_3$ | = .6152971E + 00 |
| $a_4$ | = −.5384790E − 01 | $b_4$ | = −.5155725E + 00 |
| $a_5$ | = .2295512E + 00 | $b_5$ | = −.1731848E + 00 |
| $a_6$ | = −.1397968E + 00 | $b_6$ | = .9032223E + 00 |
| $a_7$ | = −.2212853E + 00 | $b_7$ | = −.3302465E + 00 |
| $a_8$ | = −.1756457E − 01 | $b_8$ | = −.1278819E + 01 |
| $a_9$ | = .6651361E + 00 | $b_9$ | = .1806996E + 01 |
| $a_{10}$ | = −.2898495E + 00 | $b_{10}$ | = −.1636288E + 01 |
| $a_{11}$ | = −.4032059E − 01 | $b_{11}$ | = .1498719E + 01 |
| $a_{12}$ | = .9706490E − 01 | $b_{12}$ | = −.1124145E + 01 |
| $a_{13}$ | = −.2686708E + 00 | $b_{13}$ | = .6521518E + 00 |
| $a_{14}$ | = .8005762E − 01 | $b_{14}$ | = −.4333774E + 00 |
| $a_{15}$ | = .5010519E − 01 | $b_{15}$ | = .5338715E + 00 |
| $a_{16}$ | = .5203353E − 01 | $b_{16}$ | = −.4896732E + 00 |
| $a_{17}$ | = −.5112985E − 01 | $b_{17}$ | = .1648639E + 00 |

Figure 4:
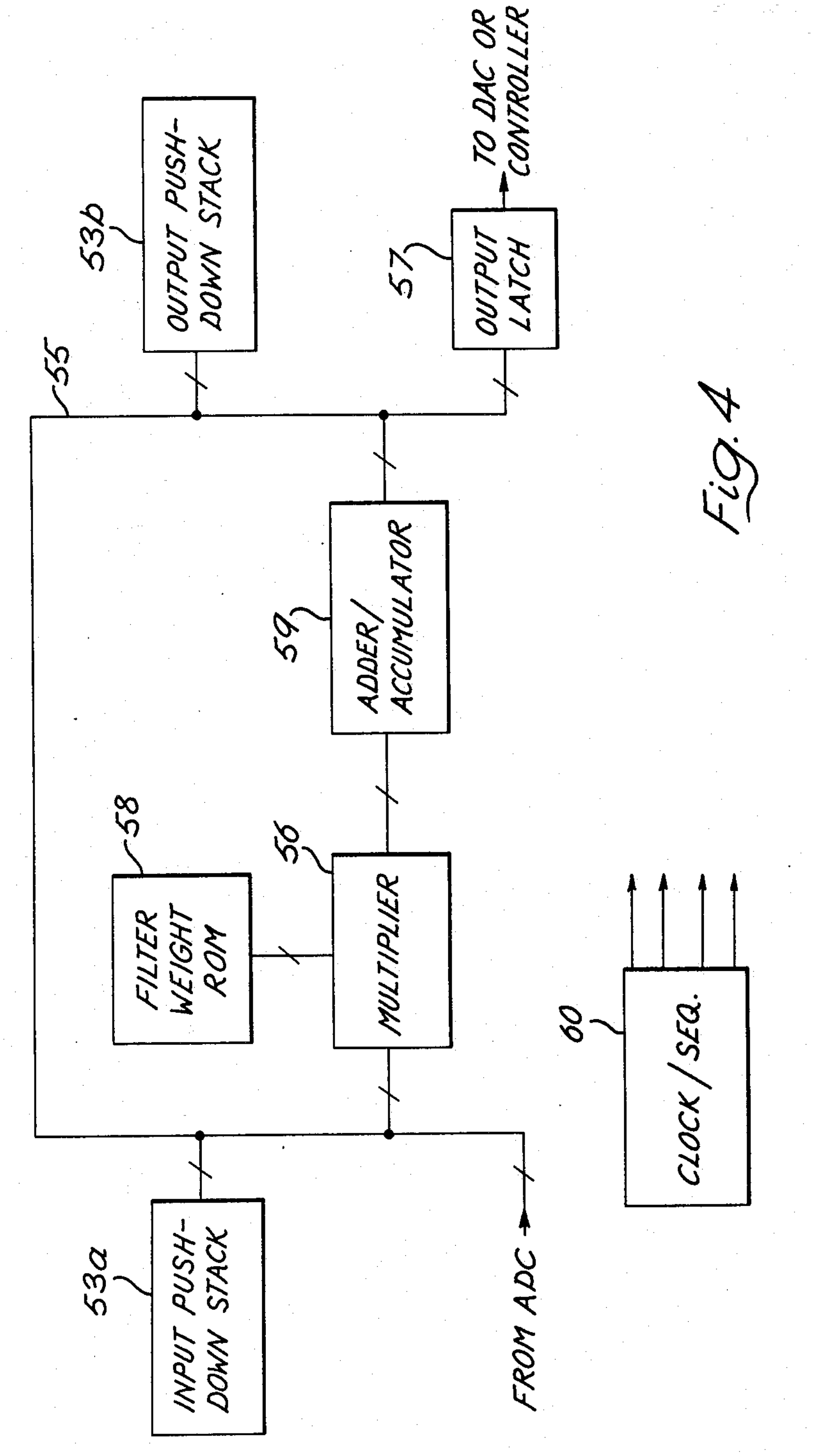
FIG. 4 is a block diagram showing in more detail circuits used in a typical implementation of the filters of FIGS. 1 and 2.

An example of the circuit diagram of a typical digital filter based on FIG. 2 at 10 and FIG. 3 and constructed from integrated circuits is shown in FIG. 4.

A RAM having two areas **53*a* and 53*b* for input and output push-down stacks, respectively, is connected to a common data bus 55 which is also coupled to a multiplier 56, an output latch 57 and to receive signals from an analogue-to-digital converter, for example that A/D converter 17. The latch 57 is connected to a digital-to-analogue converter for example 18. Separate buses connect a filter weight ROM 58 to the multiplier 56 and the multiplier output to an adder/accumulator 59. The operation of the filter is controlled by a clock/sequencer 60. The input and output stacks are in this example contained in one RAM with the most significant bit of the address specifying input or output. The multiplier output is calculated continuously and thus changes a short time after every input change. The clock/sequencer 60 may be formed from an oscillator, a counter and a ROM arranged in a similar way to a microcode sequencer in a computer. A filter weight counter and a stack counter are also provided (but not shown) to address the ROM 58, and the RAM areas 53*a* and 53*b***, respectively. The control bits in the ROM correspond to:

Bit 0 ADC—start conversion
Bit 1 ADC—bus buffer enable (bbe)
Bit 2 Stack—select input (0) or output (1)
Bit 3 Stack—increment address counter
Bit 4 Stack—write
Bit 5 Stack —bus buffer enable
Bit 6 Filter weight counter—increment
Bit 7 Filter weight counter—reset
Bit 8 Add/Accumulate—start
Bit 9 Add/Accumulate—bus buffer enable
Bit 10 Add/Accumulate—clear accumulator
Bit 11 Output latch—latch data from bus To control a digital filter with sixteen input and sixteen output weights the ROM, in this example, contains the code shown in the Table III.

In operation the counter for the ROM in the clock/sequencer 60 cycles through its states providing the bits in columns 0 to 11 of Table III and these bits cause the operations shown in the list above to occur. The operations corresponding to ROM counter counts 1 to 7, read in each input signal from the A/C, write to the input stack, calculate a new output in dependence on the previous cycle and write the output to the output stack and the output latch. The adder/accumulator is then cleared ready for the next cycle of operations.

Operations 8 to 49 make calculations corresponding to the network 45 of FIG. 2, each coefficient being used in a respective sub-cycle of three operations, for example operations 8, 9 and 10 or 11, 12 and 13. Since such sub-cycles are repetitive operations 14 to 49 are not shown in Table III.

Operations 50 to 100 not all of which are shown carry out similar sub-cycles corresponding to the network 48 in FIG. 6*a* and the cycle then repeats. When the stack counter is full in operation 49 and is incremented in operation 50 it reverts to zero and similarly the filter weight counter reverts to zero at the beginning of each new cycle.

RAMS, ROMS, multipliers, counters, oscillators and adder/accumulators can be obtained as integrated circuits for the construction of the digital filter shown in FIG. 3.

In order to set up the arrangement of FIG. 2 the filters 10, 12 and 13 are disconnected and the amplifier 20 is switched off. The noise signals then obtained at the analogue-to-digital converters 17 and 17′ corresponding to the outputs of the microphones d and p are used to identify the filter characteristic F which is $A_{pn}/A_{dn}$. The first attempt at the characteristic $T_a$ is obtained by the method described in Application No. 8000277 and is as follows.

Signals representing noise are generated by a computer 21 and passed by way of a transmitting arrangement 22 which comprises an anti-aliasing filter and a power amplifier. Signals received by the microphone 9 at d are passed through a receiving system 23 comprising a pre-amplifier, an anti-aliasing filter and an analogue-to-digital converter. In addition the computer 21 provides signals for a further transmitting system 22′ which is identical with the system 22 and a microphone is provided at the point p and connected by way of receiving system 23′ which is identical to the receiving system 23.

Figure 5:
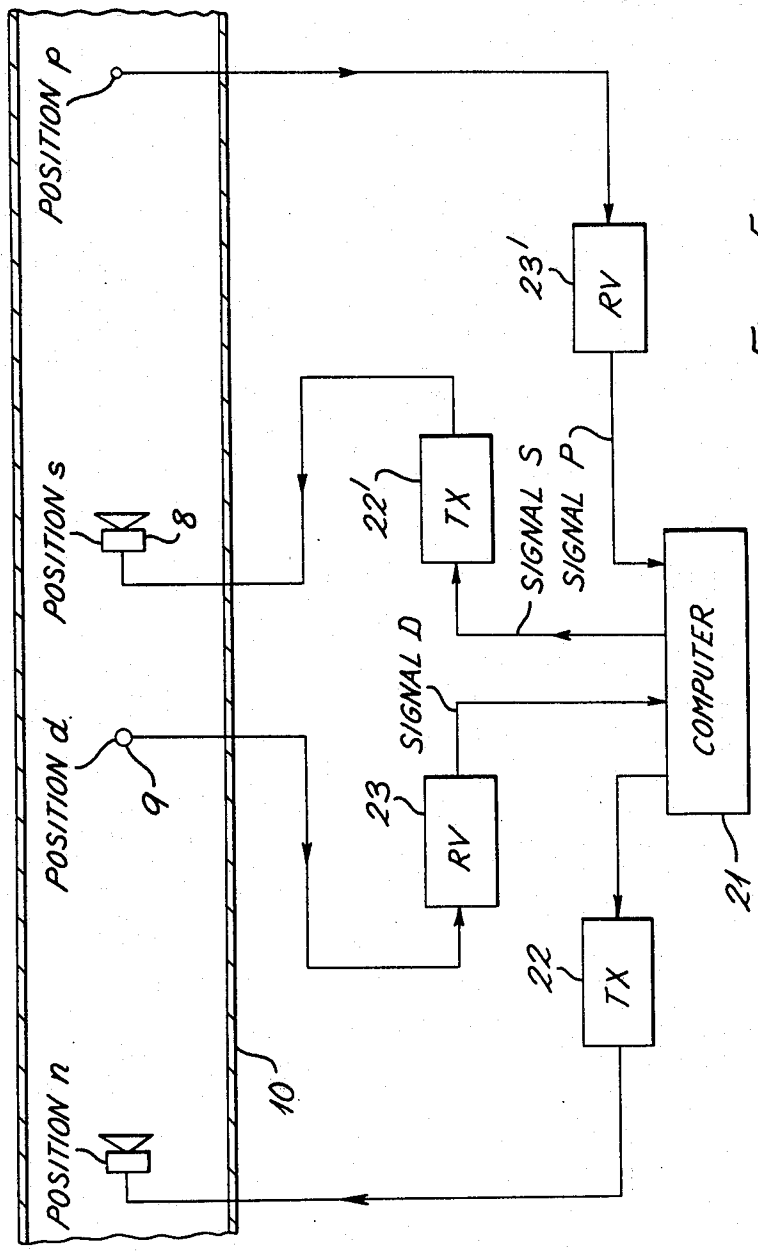
FIG. 5 is a block diagram of a test arrangement used in deriving a first value of a transfer function $T_d$ required in the circuits of FIGS. 1 and 2.
Figure 6:
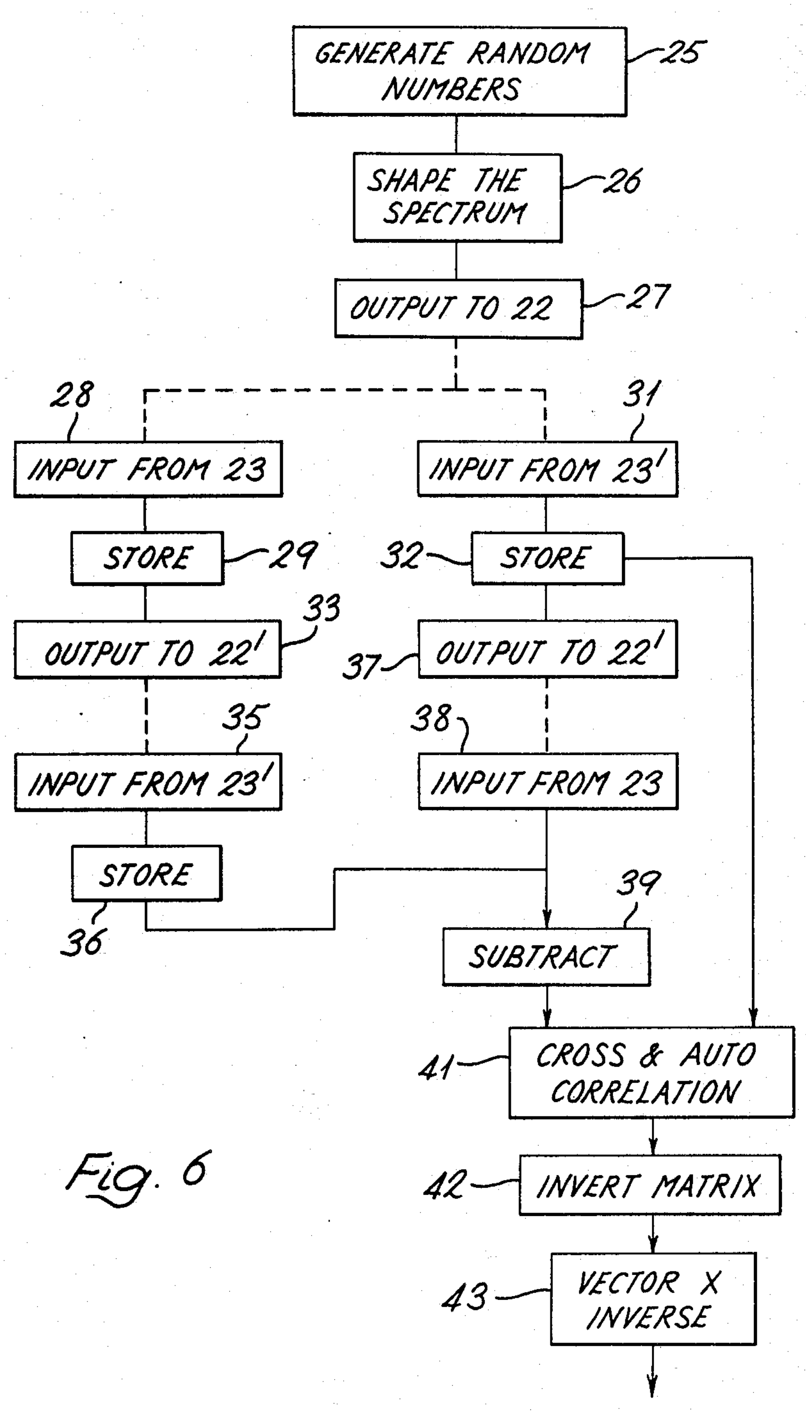
FIG. 6 is a flow diagram of the operation of the test arrangement of FIG. 5.

In using the test arrangement of FIG. 5 the computer 21 is programmed according to a flow chart shown in FIG. 6.

A series of random numbers is generated in an operation 25, these numbers specifying white noise when passed to the analogue-to-digital converter in the transmitting system 22. However in order to pre-emphasize the noise generated, the random numbers are processed in an operation 26 which shapes the spectrum of the noise produced so that it compensates for the response of the loudspeaker at n. The process 26 of shaping the spectrum is carried out using a digital filter, that is using the computer 21 to act as a digital filter as described above.

The digital output from the computer 21 is passed in an operation 27 to the transmitting system 22 and as a

TABLE III

| Bits | | | | | | | | | | | | Counters | | | |
|---|---|---|---|---|---|---|---|---|---|---|---|---|---|---|---|
| | | | | | | | | | | | | | | Filter | |
| 0 | 1 | 2 | 3 | 4 | 5 | 6 | 7 | 8 | 9 | 10 | 11 | ROM | Stack | weight | Comments |
| 1 | 0 | 0 | 1 | 0 | 0 | 0 | 1 | 0 | 0 | 0 | 0 | 1 | 0 | 0 | ADC start, increase stack and clear filter weight counter |
| 0 | 1 | 0 | 0 | 0 | 0 | 0 | 0 | 0 | 0 | 0 | 0 | 2 | 0 | 0 | ADC bbe |
| 0 | 0 | 0 | 0 | 1 | 0 | 0 | 0 | 0 | 0 | 0 | 0 | 3 | 0 | 0 | Write to input stack |
| 0 | 0 | 0 | 0 | 0 | 0 | 0 | 0 | 1 | 0 | 0 | 0 | 4 | 0 | 0 | Add/Acc start |
| 0 | 0 | 0 | 0 | 0 | 0 | 0 | 0 | 0 | 1 | 0 | 0 | 5 | 0 | 0 | Add/Acc bbe |
| 0 | 0 | 1 | 0 | 1 | 0 | 0 | 0 | 0 | 0 | 0 | 1 | 6 | 0 | 0 | Write to output stack, output latch |
| 0 | 0 | 0 | 1 | 0 | 0 | 0 | 0 | 0 | 0 | 1 | 0 | 7 | 1 | 0 | Clear Acc, increase stack |
| 0 | 0 | 0 | 1 | 0 | 0 | 1 | 0 | 0 | 0 | 0 | 0 | 8 | 2 | 1 | Increase stack and weights |
| 0 | 0 | 0 | 0 | 0 | 1 | 0 | 0 | 0 | 0 | 0 | 0 | 9 | 2 | 1 | Stack bbe |
| 0 | 0 | 0 | 0 | 0 | 0 | 0 | 0 | 1 | 0 | 0 | 0 | 10 | 2 | 1 | Add/Acc start |
| 0 | 0 | 0 | 1 | 0 | 0 | 1 | 0 | 0 | 0 | 0 | 0 | 11 | 3 | 2 | Increase stack and weights |
| 0 | 0 | 0 | 0 | 0 | 1 | 0 | 0 | 0 | 0 | 0 | 0 | 12 | 3 | 2 | Stack bbe |
| 0 | 0 | 0 | 0 | 0 | 0 | 0 | 0 | 1 | 0 | 0 | 0 | 13 | 3 | 2 | Add/Acc start |
| – | – | – | – | – | – | – | – | – | – | – | – | — | – | — | |
| – | – | – | – | – | – | – | – | – | – | – | – | — | – | — | |
| 0 | 0 | 0 | 1 | 0 | 0 | 1 | 0 | 0 | 0 | 0 | 0 | 50 | 0 | 15 | Increase stack and weights |
| 0 | 0 | 0 | 0 | 0 | 1 | 0 | 0 | 0 | 0 | 0 | 0 | 51 | 0 | 15 | Stack bbe |
| 0 | 0 | 0 | 0 | 0 | 0 | 0 | 0 | 1 | 0 | 0 | 0 | 52 | 0 | 15 | Add/Acc start |
| 0 | 0 | 0 | 1 | 0 | 0 | 1 | 0 | 0 | 0 | 0 | 0 | 53 | 1 | 16 | Increase stack and weights |
| 0 | 0 | 1 | 0 | 0 | 1 | 0 | 0 | 0 | 0 | 0 | 0 | 54 | 1 | 16 | Stack bbe |
| 0 | 0 | 0 | 0 | 0 | 0 | 0 | 0 | 1 | 0 | 0 | 0 | 55 | 1 | 16 | Add/Acc start |
| – | – | – | – | – | – | – | – | – | – | – | – | — | – | — | |
| – | – | – | – | – | – | – | – | – | – | – | – | — | – | — | |
| 0 | 0 | 0 | 1 | 0 | 0 | 1 | 0 | 0 | 0 | 0 | 0 | 98 | 0 | 31 | Increase stack and weights |
| 0 | 0 | 1 | 0 | 0 | 1 | 0 | 0 | 0 | 0 | 0 | 0 | 99 | 0 | 31 | Stack bbe |
| 0 | 0 | 0 | 0 | 0 | 0 | 0 | 0 | 1 | 0 | 0 | 0 | 100 | 0 | 31 | Add/Acc start |
| 1 | 0 | 0 | 1 | 0 | 0 | 0 | 1 | 0 | 0 | 0 | 0 | 1 | 1 | 0 | Start cycle again |

As has been mentioned the filters 10, 12 and 13 can be formed by a computer when the diagram of the circuit 10 shown in FIG. 2 can be regarded as a flow diagram. It is well known that computers can be employed as digital filters and a suitable program is a routine matter and is therefore not described in this specification.

A single microcomputer can be used as the filters 10, 12 and 13, to carry out the subtraction function of the subtraction circuit 14, and as the controller 11. In such an arrangement the microcomputer has as its primary task the filtering functions and as a background task the updating of the coefficients for the filter 10.

result the loudspeaker at n generates a sound which is received by the microphones at d and p. Signals from the microphone at d are processed by the receiving system 23 and as a result digital signals are input to the computer 21 in an operation 28. These signals are then stored in an operation 29.

Simultaneously signals from the microphone p are converted into digital input signals in an operation 31 and stored in an operation 32.

Using the convention specified above the store 29 now stores a series of numbers representing the product $A_{dn}N$ and the store 32 stores a series of numbers representing the product $A_{pn}N$.

The next steps in the testing procedure are first to replay the signals stored in operation 29 and then replay those stored in operation 32. Thus in operations 33 and 35 signals representing $A_{dn}N$ are output through the transmitting system 22' to the speaker at s and received by way of the receiving system 23' and then stored in an operation 36. When this step has been carried out signals representing $A_{pn}N$ are output to the speaker s in operation 37 and received by way of the microphone d and the receiving system 23 in an operation 38.

The information stored in operation 36 is a series of numbers representing $A_{ps}A_{dn}N$ and the output from operation 38 is a series of numbers representing $A_{ds}A_{pn}N$ and thus an operation 39 provides output signals representative of the demoninator of the required transfer function $T_d$. The numerator of this function is available from the signals stored in operation 32. After carrying out the operations illustrated in the flow diagram of FIG. 6a information for calculating the transfer function $T_d$ is available.

However instead of working out the transfer function the operations given in the flow chart of FIG. 6 are carried out by the computer 21 to generate coefficients for the digital filter 10 of FIGS. 1 and 2.

Signals from the subtract operation 39 and signals corresponding to those stored in operation 32 are each autocorrelated and then cross correlated in an operation 41 to determine the matrix of correlations and a vector. The matrix is inverted in operation 42 and the vector is multiplied by the inverse in operation 43 to provide a set of filter coefficients.

Problems may occur with stability at low frequencies since the loudspeaker 8 at s cannot respond at d.c. and there are high pass filters in the associated transmitting circuits. This problem can be overcome by removing the low frequency part of the signal from microphone 6 and the adaptive system then operates, at low frequencies, as if it has already reached an acceptable characteristic since there is no correction signal. Removal of the low frequency part of the microphone signal can be performed by Fourier transforming (using the DFT method as described in "Introduction to Continuous and Digital Control Systems" by R. Saucedo and E. E. Schring (MacMillan Co., 1970) the signals received by the controller 11, setting the low frequency part to zero and inverse Fourier transforming (by using the inverse DFT which is also described in "Introduction to Continuous and Digital Control Systems"). This rather complex procedure to remove the low frequency part of the signals is needed so as not to alter the signals above the cut-off frequency.

The order of the filter 10 identified at each iteration step of adaptive control must be the same. This is because there is very little performance signal when the function is close to the correct one and so the best fit to the data (which is predominantly the input and output of a filter) will be one with the same order. A 20 pole, 20 zero and one delay filter has been found to be satisfactory in some applications where the noise occurs in a duct and the two microphones and the loudspeaker are positioned in the duct. A sampling frequency of 500 Hz was used and the anti-aliasing filters had a turnover frequency of 200 Hz. The filters 12 and 13 were also 20 pole 20 zero filters but with eight delays.

While certain embodiments of the invention have been specifically described it will be realised that the invention can be put into practice in many other ways. In particular other methods of system identification may be used to determine the coefficients of the filters, for example the "maximum likelihood estimator" or the "instrumental variable method", both mentioned in the paper by Åström and Eykhoff, may be used.

I claim:

1. A sound control system comprising:

first receiver means for generating first output signals representative of sound received at, or near, a first location where sound from a second location is to be cancelled, second receiver means for receiving signals at a third location and generating second output signals related to sounds at the second location, operational means including a computing section for operating on the second output signals according to a transfer function and generating input signals, and a transmission section for receiving said input signals and generating sounds at a fourth location, which when received at the first location, tend to cancel sound received from the second location at the first location, and a control means automatically adjusting the said transfer function, the control means being responsive to output signals of the first and second receiver means thereby optimizing cancellation of sound received from the second location at the first location.

2. A sound control system according to claim 1 wherein the distance between the first location and the fourth location plus the distance between the second location and the third location is less than the distance between the first and second locations.

3. A sound control system according to claim 2 wherein the control means comprises first filter means for deriving a first control signal equal to the second output signal multiplied by a further transfer function, second filter means for deriving a second control signal equal to the input signals for the transmission means multiplied by the said further transfer function, means for subtracting the said first output signals from the first control signal to derive a difference signal, and system-identification means connected to receive the said difference signal, and the second control signal, and the system-identification means providing an output signal for setting the transfer function of the operational means.

4. A sound control system according to claim 3 wherein the said further transfer function is equal to the transfer function between a source of sound at the second location in operation generating sound to be cancelled at the first location and the output of the first receiver means divided by the transfer function between the said source and the output of the second receiver means.

5. A sound control system according to claim 3 wherein the system-identification means is constructed to divide the second control signal by the said difference signal to provide a signal representative of the transfer function of the operational means.

6. A sound control system according to claim 3 wherein at least one of the first and second filter means and the operational means comprises a digital filter.

7. A sound control system according to claim 3 wherein the operational means comprises a digital filter having a characteristic which is a function of a series of coefficients and the system-identification means provides output signals which determine the coefficients of the digital filter.

8. A sound control system according to claim 3 including at least one computer forming at least one of the first and second filters, the operational means, and the control means.

9. A sound control system according to claim 3 wherein the said further transfer function is such that when there is no significant sound cancellation at the first location, the system identification means sets the transfer function of the operational means to a value which causes convergence towards useful sound cancellation, and when no better sound cancellation at the first location can be achieved by the system, the system identification means retains the transfer function of the operational means at the current value.

10. A method of sound control for reducing noise in a first location due to a noise source in a second location, the method comprising:

generating first and second output signals representative of sounds received at the first location and at a third location, respectively, operating on the said second output signals according to a transfer function to provide signals for generating sounds at a fourth location, the transfer function being such that sounds generated at the fourth location tend to cancel sound received from the second location at the first location, and automatically adjusting the said transfer function, the adjusting being responsive to the said first and second output signals thereby optimizing cancellation of sound received from the second location at the first location.

* * * * *